United States Patent [19]

Rode et al.

[11] 4,132,465
[45] Jan. 2, 1979

[54] ELECTROCHROME ELEMENT CONTROL DEVICE

[75] Inventors: Oyars A. Rode; Andrei R. Lusis; Yanis K. Klyavin, all of Riga; Talivaldis V. Zamozdik, Jurmala, all of U.S.S.R.

[73] Assignee: Gosudarstvenny Universitet Imeni Petra Stuchki, Riga, U.S.S.R.

[21] Appl. No.: 751,977

[22] Filed: Dec. 17, 1976

[30] Foreign Application Priority Data

Dec. 22, 1975 [SU] U.S.S.R. .................. 2197453

[51] Int. Cl.² ............................. G02F 1/00
[52] U.S. Cl. ..................... 350/357; 307/270; 340/813
[58] Field of Search .......... 350/160 R, 357; 340/324 M, 324 R, 336; 307/296, 270

[56] References Cited

U.S. PATENT DOCUMENTS

| 3,932,773 | 1/1976 | Luscher et al. ............... 307/270 |
| 3,980,899 | 9/1976 | Shimada et al. ............ 307/270 X |

Primary Examiner—Stanley D. Miller, Jr.
Assistant Examiner—James W. Davie
Attorney, Agent, or Firm—Haseltine, Lake & Waters

[57] ABSTRACT

An electrochrome element control device comprising a voltage source connected in parallel via a switch with a circuit composed of a series-connected electrochrome element and a capacitor for limiting the time the voltage is supplied to the electrochrome element, the charged capacitor supplies voltage of opposite polarity to the electrochrome element upon closure of a second switch connected in parallel to the circuit composed of the electrochrome element and the capacitor. Control of the electrochrome element is considerably simplified therefore.

2 Claims, 5 Drawing Figures

ELECTROCHROME ELEMENT CONTROL DEVICE

FIELD OF THE INVENTION

This invention relates to optoelectronics and, in particular, to modulation of optical radiation, particularly, to devices for electrochrome element control. The proposed device can be used to control electrochrome elements for videoinformation display and modulation of electromagnetic radiation intensity in various fields of technology.

PRIOR ART

There is known a device for electrochrome element control comprising a voltage source, a rheostat and a switch through which one polarity is connected to the electrochrome element for coloring and another polarity of the voltage source is connected to the electrochrome element for its discoloring. The rheostat serves to measure the voltage fed via the switch to the electrochrome element and, thus, to change the rate of coloring and discoloring of the electrochrome element (cf., for example, U.S. Pat. No. 3,521,941 Cl. G 02 f 1/28).

However, such devices are complicated to manufacture and require complex electronic control.

There is also known an electrochrome element control device comprising an operational amplifier, two transistors of different types of conduction, whose emitters are joined and connected to one of the electrodes of the electrochrome element, and four voltage sources connected in series. The two middle voltage sources are used to control the electrochrome element and the midpoint of their pole connection is coupled to the other electrode of the electrochrome element, the opposite poles of these voltage sources being coupled via switches to respective transistor collectors. The opposite poles of the two other voltage source are coupled via switches to the operational amplifier and other elements of the circuit. When a control signal is supplied from the operational amplifier to the bases of the transistors, one of them is opened. Depending on the polarity of the controlled signal, the electrochrome element is either colored or discolored. With the "zero" signal both transistors are closed and the electrochrome element is denergized.

However, such circuit makes use of two supply sources or an uneconomical voltage divider built on resistors. Besides, voltage commutation control is a complicated task, since it requires three control signals. In order to change the polarity of the voltage supplied to the electrochrome device, two different polarities of the control signal are required and cutting the voltage off requires a third "zero" signal.

The disadvantage of such a circuit consists in that, when the transistor is opened, the electrochrome element is connected to the voltage source for a long period of time and the subsequent discoloring becomes harder, that is the speed of action of the device deteriorates.

SUMMARY OF THE INVENTION

It is an object of this invention to provide a device in which the rapid action of the electrochrome element is not diminished and its control is at the same time simplified.

This object is achieved in that in an electrochrome element control device comprising an electrochrome element, a voltage source and a switch through which the electrochrome element is connected to one of the polarities of the voltage source, according to the invention, a capacitor is connected in parallel to the electrochrome element for limiting the time the element is energized, and a second switch is connected in parallel to a circuit composed of the electrochrome element for the capacitor and closing this circuit, when the first switch is opened, thus ensuring energizing of the electrochrome element by the voltage of the other polarity during the capacitor discharge.

One of the switches can be replaced by a resistor.

This permits fast action of the electrochrome element and simplfication of its control.

BRIEF DESCRIPTION OF THE DRAWINGS

The invention will now be described in great detail with reference to specific embodiments thereof, taken in conjunction with the accompanying drawings, in which.

DETAILED DESCRIPTION

Figure 1:
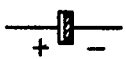
FIG. 1 is a schematic view of an electrochrome element, according to the invention.

The disclosed device for control of an electrochrome element comprises a voltage source 1 and switches 2 and 3 (FIGS. 2, 3) which are series connected to each other and connected in series with the voltage source 1. A series-connected circuit comprising an electrochrome element 4 and a capacitor 5 is connected in parallel to the switch 3. It is accepted that the electrochrome element is colored, if it is energized by the voltage of the polarity of FIG. 1. Discoloring takes place, if the polarity of the voltage is the reverse.

Figure 4:
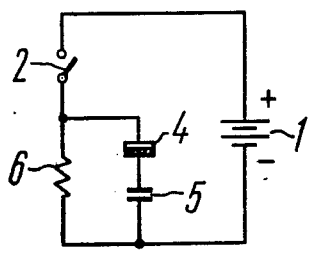
FIG. 4 shows a diagram of an electrochrome element control device with one switch, according to the invention.

A resistor can be connected instead of one of the switches 2 or 3. Such an embodiment is shown in FIG. 4, wherein the switch 3 is replaced by a resistor 6.

Various mechanical, electromagnetic and electronic switches, for example, transistors, can be used as switches.

Figure 5:
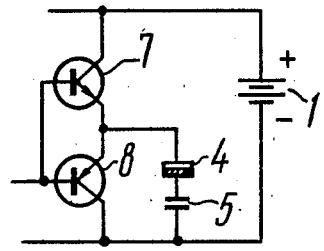
FIG. 5 shows a diagram of an electrochrome element control device with two switches built around transistors, according to the invention.

Referring to FIG. 5, an embodiment of a control device comprises in replacement of the switches 2 and 3 transistors 7 and 8 having different types of conduction.

The electrochrome element control device operates as follows.

When the switch 2 (FIG. 2) closes, the capacitor 5 is charged via the switch 2 and the electrochrome element 4 and, since the electrochrome element 4 can be regarded as a resistor, the complete voltage of the voltage source 1 is applied thereto at the beginning of the charging cycle of the capacitor 5, which causes coloring of the electrochrome element 4. As the capacitor 5 is charged, the voltage on the electrochrome element 4 decreases to zero.

When the switch 2 opens and the switch 3 closes, the capacitor 5 begins to discharge via the switch 3 and the electrochrome element 4. At the beginning of the discharge the total voltage of the charged capacitor 5 of the other polarity is applied to the electrochrome element 4, which causes discoloring of the electrochrome element 4. As the capacitor 5 discharges, the voltage on the electrochrome element 4 is gradually decreased to zero.

It is clear that in order to control the electrochrome element 4 by means of the proposed device only one voltage source 1 is required. Both during coloring and discoloring of the electrochrome element 4 voltage is applied thereto only for a brief time independently of the time the switch 2 or the switch 3 remains closed and, thus, the rapid action of the electrochrome element is ensured.

Figure 2:
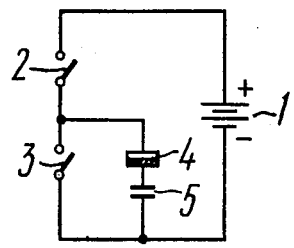
FIG. 2 shows a diagram of an electrochrome element control device with one polarity of the voltage source, according to the invention.
Figure 3:
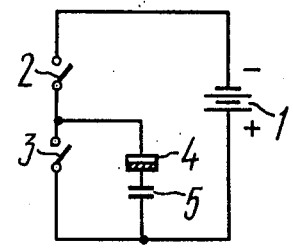
FIG. 3 shows a diagram of an electrochrome element control device with the other polarity of the voltage source, according to the invention.

The control device of FIG. 3 operates unlike the device of FIG. 2 in that, when the switch 2 is closed, the electrochrome element 4 is discolored owing to the other polarity of the voltage source. The element 4 is colored, when the switch 2 is opened and the switch 3 is closed.

The electrochrome element control device equipped with one switch (FIG. 4) operates like the device of FIG. 2, the only difference being that the capacitor 5 discharges through the electrochrome element 4 and the resistor 6. The resistor 6 permits a simplier control circuit.

Control of, for example, the transistors 7, 8 (FIG. 5) which are used as the switches 2, 3 requires only two control signals, one signal opens one transistor and the electrochrome element 4 is colored (discolored), another signal discolors (colors) the element 4. The operation of such a control device is similar to that of the device of FIGS. 2 and 3.

When the capacitor 5 is connected in series with the electrochrome element 4, control of its operation changes radically. Irrespective of the time the voltage source 1 is switched on, voltage is applied to the electrodes of the electrochrome element 4 for only a brief period. This helps to maintain the fast action of the electrochrome element and the simplicity of its control.

What is claimed is:

1. An electrochrome element control device comprising: an electrochrome element having two electrodes; a single d-c voltage source having two poles; a switch connected in series between one of the poles of said voltage source and one electrode of said electrochrome element for the supply of the voltage of one polarity to said electrochrome element; a capacitor connected in series between the other electrode of said electrochrome element and the other pole of said voltage source for limiting the time of voltage supply to said element, as well as to accummulate the charge; and a second switch connected in parallel to the circuit composed of said electrochrome element and the capacitor for closing said circuit when said first switch is opened for the discharge of said accummulated charge of the capacitor through said second switch and said electrochrome element as a voltage of the other polarity to said electrochrome element.

2. A device as claimed in claim 1, in which one of said switches is constituted as a resistor.

* * * * *